(12) United States Patent
Campbell et al.

(10) Patent No.: US 7,418,580 B1
(45) Date of Patent: Aug. 26, 2008

(54) DYNAMIC OBJECT-LEVEL CODE TRANSACTION FOR IMPROVED PERFORMANCE OF A COMPUTER

(75) Inventors: John E. Campbell, Wappingers Falls, NY (US); William T. Devine, Ulster Park, NY (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,955

(22) Filed: Dec. 2, 1999

(51) Int. Cl.
*G06F 9/30* (2006.01)
*G06F 9/45* (2006.01)

(52) U.S. Cl. .................. 712/227; 712/209; 717/136
(58) Field of Classification Search ............... 712/208, 712/213, 209, 227; 717/136–140, 151
See application file for complete search history.

(56) References Cited

U.S. PATENT DOCUMENTS

| | | | |
|---|---|---|---|
| 4,439,828 A * | 3/1984 | Martin | 712/226 |
| 4,858,105 A | 8/1989 | Kuriyama et al. | 712/235 |
| 5,337,415 A | 8/1994 | DeLano et al. | 712/213 |
| 5,502,826 A * | 3/1996 | Vassiliadis et al. | 712/213 |
| 5,598,546 A * | 1/1997 | Blomgren | 712/209 |
| 5,721,854 A * | 2/1998 | Ebcioglu et al. | 712/203 |
| 5,732,234 A | 3/1998 | Vassiliadis et al. | 712/200 |
| 5,751,982 A * | 5/1998 | Morley | 703/26 |
| 5,751,984 A | 5/1998 | Chang et al. | 712/216 |
| 5,925,124 A * | 7/1999 | Hilgendorf et al. | 712/209 |
| 6,282,633 B1 * | 8/2001 | Killian et al. | 712/208 |

\* cited by examiner

*Primary Examiner*—William H Wood
(74) *Attorney, Agent, or Firm*—Connolly Bove Lodge & Hutz LLP; Anthony Canale

(57) ABSTRACT

A system and method for improving the efficiency of an object-level instruction stream in a computer processor. Translation logic for generating translated instructions from an object-level instruction stream in a RISC-architected computer processor, and an execution unit which executes the translated instructions, are integrated into the processor. The translation logic combines the functions of a plurality of the object-level instructions into a single translated instruction which can be dispatched to a single execution unit as compared with the untranslated instructions, which would otherwise be serially dispatched to separate execution units. Processor throughput is thereby increased since the number of instructions which can be dispatched per cycle is extended.

16 Claims, 13 Drawing Sheets

DYNAMIC OBJECT-LEVEL CODE TRANSACTION FOR IMPROVED PERFORMANCE OF A COMPUTER

BACKGROUND OF THE INVENTION

The present invention relates to the field of computer processor architecture, and more particularly, to a system and method for dynamically translating instructions in an object-level instruction stream to improve processor performance.

Improved performance for computer processors is a continuing goal for computer designers. In general, improved performance may be defined as executing more instructions in less time. Steady increases in processor speeds have achieved gains in the execution rate of instructions. Also, efforts to increase parallelism, by which is meant the simultaneous or nearly simultaneous processing of multiple instructions, have resulted in increased processor throughput.

Pipelining is a known technique for achieving a form of parallel processing. In pipelining, instructions are divided into independent stages, each requiring a separate hardware element to execute. Such pipeline stages might consist of an address translation stage, an operand fetch stage, an execution stage, and an operand write back stage. The stages are overlapped so that multiple instructions can be in progress at the same time, although each is in a different stage. For each clock cycle, a stage of each instruction in progress is executed, and, absent certain slowing factors, an average execution rate of one instruction per clock cycle is possible.

Developments in processor architectures which have advanced the parallelism afforded by pipelining include superscalar technology. Superscalar processors provide multiple execution units, allowing for multiple pipelines. Additionally, superscalar processors can alleviate slowdowns due to pipelining "clogs" by performing out-of-order execution. In pipelining, dependencies between instructions can cause wasted clock cycles. Superscalar processors look for instructions without dependencies and perform out-of-order processing of such instructions.

Superscalar processors can also perform speculative processing to reduce delays associated with resolving branch conditions in instructions. In such speculative processing, the processor performs branch prediction, which is a mechanism by which the processor guesses whether or not a particular branch will be taken, and, in advance, fetches the appropriate instructions accordingly.

Examples of superscalar processors include processors having RISC (Reduced Instruction Set Computing) architecture. To boost processing speed, typically RISC processors use uniform instruction lengths, minimize the number of instructions that access memory, and have more general purpose registers than CISC (Complex Instruction-Set Computing) processors.

RISC processor designs and techniques such as pipelining represent approaches to improving the performance of computer processors. However, opportunities exist for further improvement.

Typically, in a RISC-architected processor, parallel processing is effected by dispatching instructions to be simultaneously executed on separate execution units. Ideally, this results in increased processor throughput. However, in practice, an instruction in one pipeline often must wait for the results of an instruction in another pipeline. This represents an opportunity for improved performance, since multiple instructions which have, for example, commonalities between operands, and which would otherwise be serially dispatched to separate execution units can be combined into a single instruction which is dispatched to a single execution unit, thereby extending the number of instructions which can be dispatched per clock cycle.

Opportunities also exist to better utilize the resources afforded by improved processor hardware. Advances in processor capabilities sometimes outpace the ability of software to exploit them to the greatest extent possible. One such example is that of software designed to work with an 8-bit register architecture when processor architectures providing for faster 16-bit registers are available. Programs compiled to run in the older, 8-bit architected system represent "legacy code" which is inefficient given 16-bit capabilities. To take advantage of available 16-bit architecture, methods employed have included recompiling legacy code to create instructions implementing 16-bit operands. Alternatively, architectures have been implemented which allow both 8-bit and 16-bit instructions to be executed. However, such architectures retain inefficiency in that, to the extent that they are used to run 8-bit legacy code, the 16-bit capabilities are being underutilized.

A similar situation occurs in VLIW (Very Long Instruction Word) processors. Legacy code underutilizes VLIW processing capabilities, or may not even be executable at all on VLIW processors.

Prior art combination instructions are known. They group instructions that are not dependent on each other for simultaneous dispatch to available execution units. Dependent instructions must be withheld to allow prior instructions to produce needed operands.

In view of the foregoing, further improvement in techniques for increasing parallelism and in utilization of available processor upgrades is needed.

SUMMARY OF THE INVENTION

A system and method according to the present invention provides an approach to addressing the foregoing need. According to the present invention, translation logic for generating translated instructions from an object-level instruction stream, and an execution unit which executes the translated instructions, are integrated into a computer processor comprising multiple execution units. The translated instructions combine the functions of a plurality of the object-level instructions into a single translated instruction.

In an embodiment, the translation logic comprises a translation table which includes conditions for object-level instructions in the instruction stream to qualify for translation, and detection logic which compares the object-level instructions against entries in the translation table. When the detection logic detects qualifying instructions based on information in the table, it generates a signal to control logic. The control logic builds a translated instruction corresponding to the qualifying instructions and replaces the qualifying instructions in the instruction stream with the translated instruction, which is then dispatched to the execution unit which executes translated instructions.

The translated instructions generated by the translation logic represent an improvement in processor performance which is enabled by the present invention. Parallelism, and thus, processor throughput is increased since multiple instructions which would otherwise have been serially dispatched to multiple, separate execution units are instead dispatched to a single execution unit, freeing other execution units and extending the number of instructions which can be dispatched per cycle. Waiting time for interdependent instructions in separate pipelines is reduced.

In another embodiment, translation logic is used to detect "legacy" instructions in an instruction stream and construct instructions having a format which is executable by an upgraded processor architecture, allowing better utilization of the upgraded architecture.

In still another embodiment, software executed on a processor includes instructions which are encoded to protect the software against unauthorized use. Translation logic is used to detect encoded instructions in an object-level instruction stream and decode the instructions prior to execution, using a translation table which functions as a security code.

DETAILED DESCRIPTION OF THE INVENTION

In the following, illustrative examples are given of embodiments of the invention as applied to RISC fixed-length instructions. However, it is noted that the invention would find useful application in a variety of other processor architectures, including CISC-architected processors.

Figure 1:
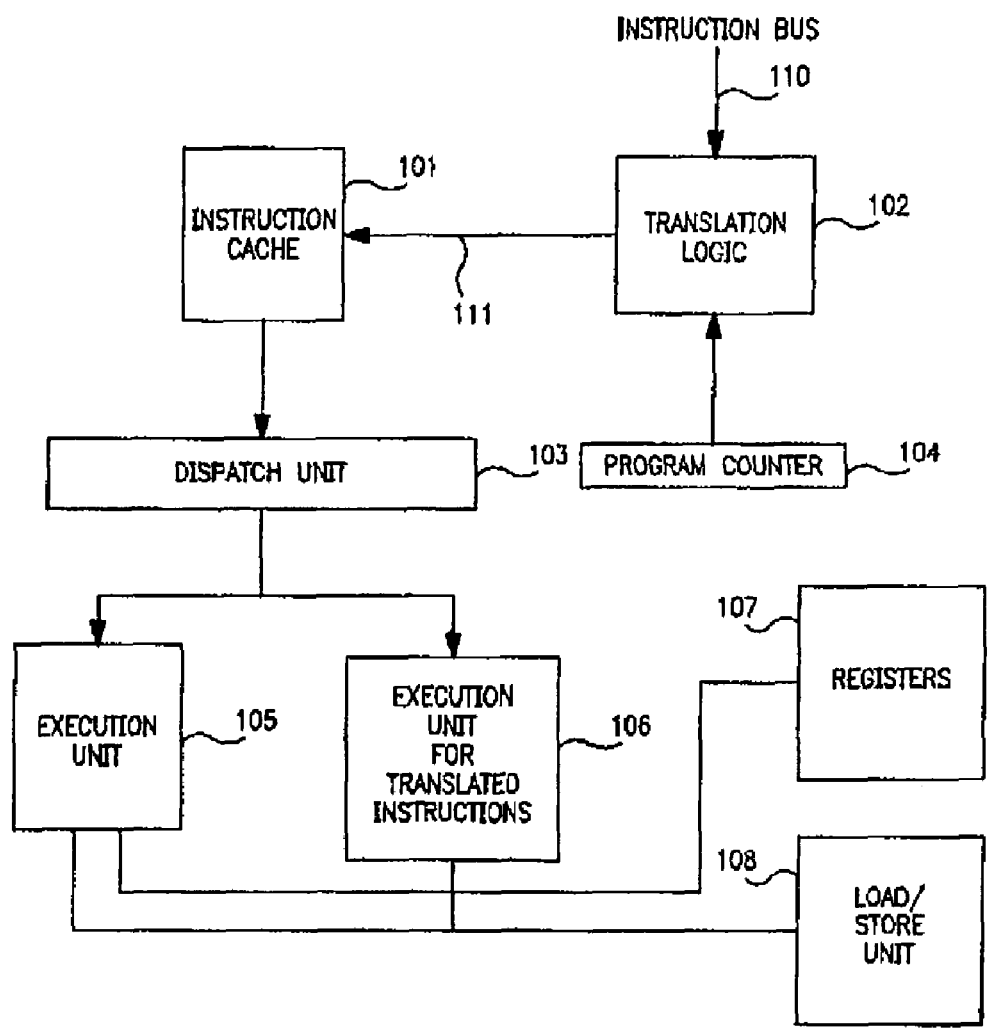
FIG. 1 shows a high-level functional block diagram of an embodiment of the invention.

FIG. 1 shows a high-level functional block diagram representing an embodiment of the present invention. FIG. 1 depicts a superscalar RISC-architected computer processor which comprises multiple execution units for processing multiple pipelines. The processor includes conventional elements along with elements for generating and executing translated instructions according to the present invention.

In the general operation of the processor of FIG. 1, object-level computer instructions are transferred from a memory (not shown) over instruction bus 110. The object-level instructions are received by translation logic 102, which contains logic for generating translated instructions from the object-level instructions. The translation logic 102 analyzes the incoming instruction stream and generates translated instructions from suitable candidate instructions in the original instruction stream, if any occur. Program counter 104 tracks the location of each instruction. The translation logic 102 replaces the candidate instructions with translated instructions using positional information supplied by the program counter 104, and transmits both untranslated instructions and translated instructions over instruction bus 111 to the instruction cache 101.

The instruction cache 101 transfers instructions to the dispatch unit 103. Dispatch unit 103 includes logic for determining what type of execution unit is required by a particular instruction, and dispatches instructions to execution units 105 and 106 accordingly. In FIG. 1, execution unit 105 represents a conventional execution unit such as would typically be implemented in a RISC-architected processor, while execution unit 106 represents an execution unit with the capability of executing both conventional instructions and translated instructions generated by translation logic 102. Execution units 105 and 106 access the general purpose registers 107 or the load/store unit 108 to carry out the execution of an instruction depending on the type of instruction; i.e., the load/store unit 108 is accessed for instructions which require data to be stored in/or loaded from memory, while instructions requiring only register operations are sent to the general purpose registers 107.

Figure 2:
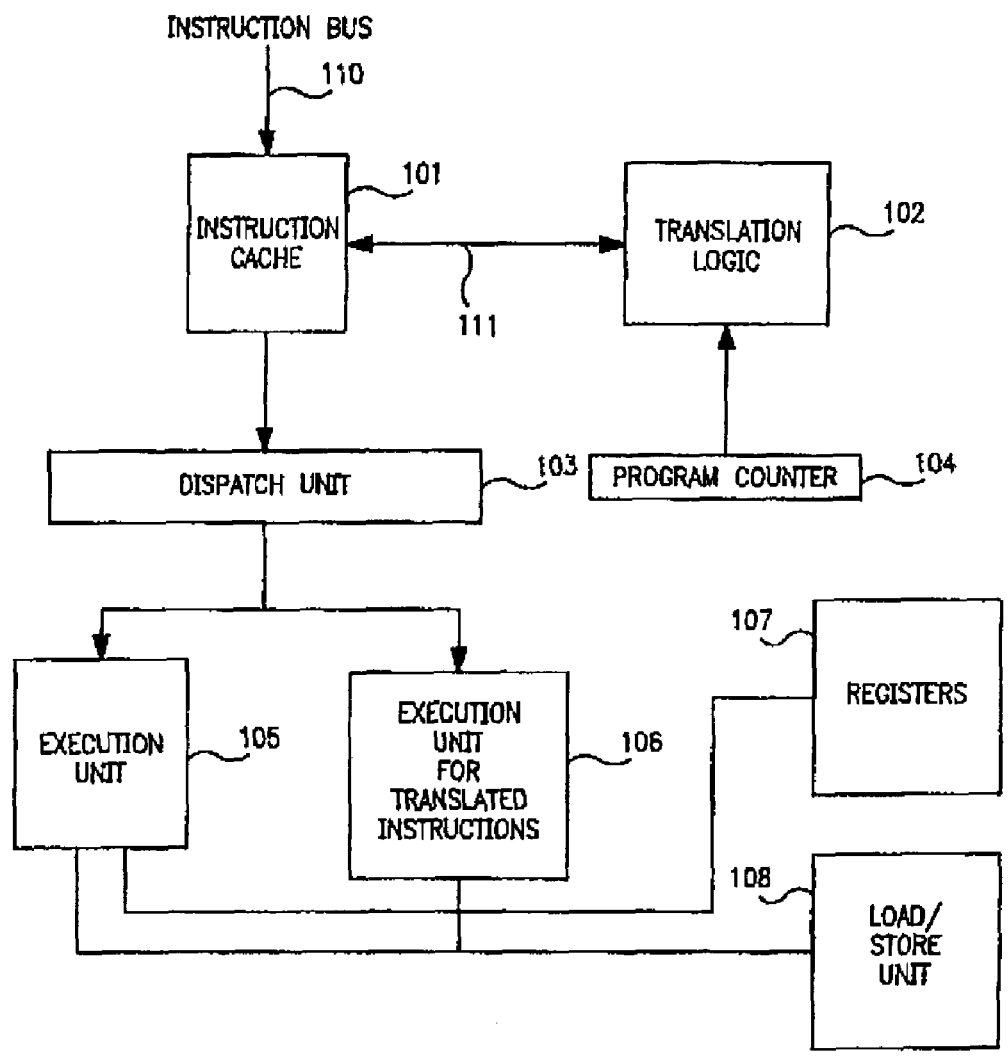
FIG. 2 shows a high-level functional block diagram of a second embodiment of the present invention.

FIG. 2 shows an alternate embodiment to that shown in FIG. 1. In FIG. 2, instruction cache 101 is loaded via instruction bus 110 as in conventional systems, which allows for store forwarding to speed up latency. The newly-loaded instructions are analyzed by the translation logic 102 for the occurrence of instructions that can be replaced by a translated instruction. If any occur, the translation logic 102 replaces the candidate instructions in the instruction cache 101 via bus 111 with translated instructions using positional information supplied by the program counter 104. Operations proceed from that point as in FIG. 1.

Figure 3:
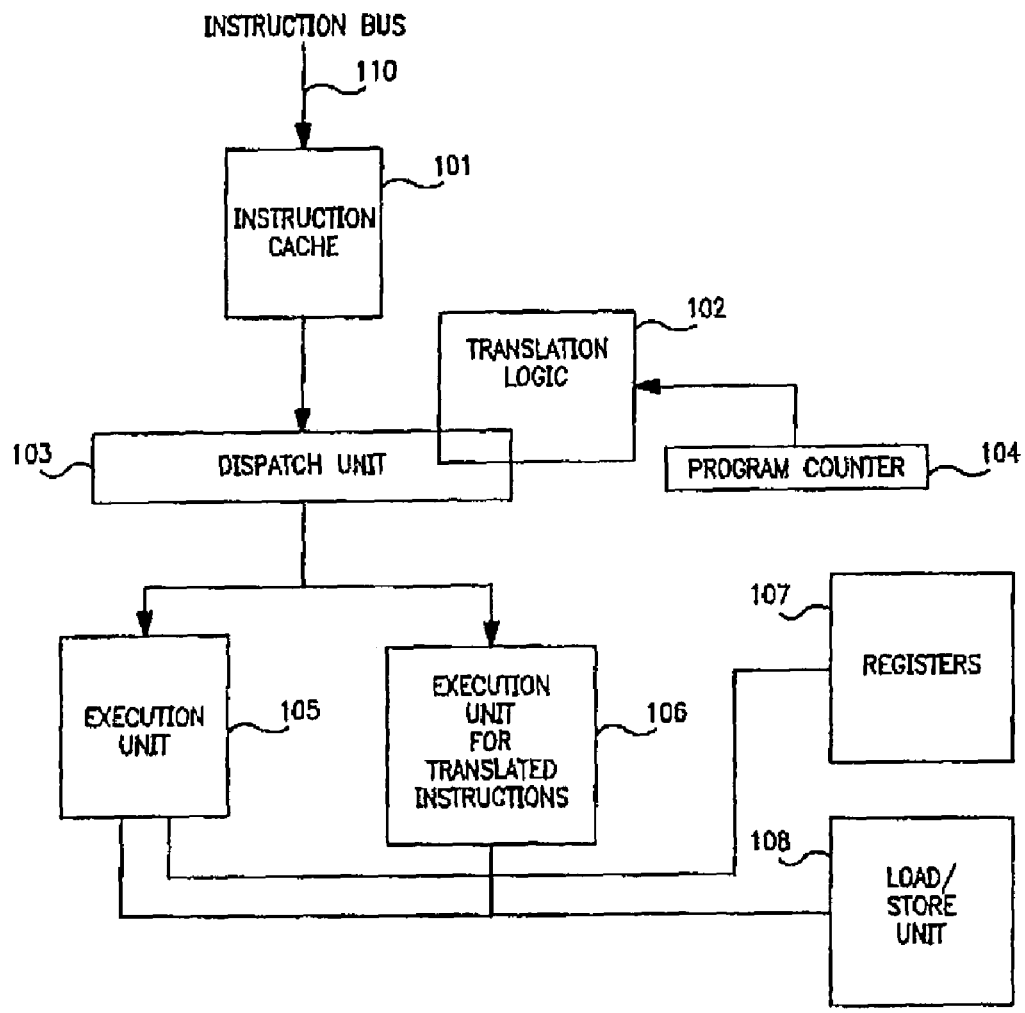
FIG. 3 shows a high-level functional block diagram of a third embodiment of the present invention.

FIG. 3 shows another alternate embodiment to those shown in FIGS. 1 and 2. In FIG. 3, instruction cache 101 is conventional. Dispatch unit 103 includes translation logic as illustrated by block 102. The translation logic 102 analyzes instructions sent to dispatch unit 103 from the instruction cache 101 to detect candidate instructions for translation, dynamically translates the candidate instructions and replaces them with translated instructions prior to their being dispatched to an execution unit 106.

An example of a commercially available RISC-architected processor having conventional elements as shown in FIG. 1 is the PowerPC®, which is well-known in the art. Execution unit 105 in FIG. 1, for example, could be an integer unit for performing integer arithmetic and logical instructions, a load/store unit for performing load/store instructions to memory, a floating-point unit for performing floating-point operations, or a branch processing unit for handling branch prediction and resolution. A description of the PowerPC® is available in the *PowerPC 603 RISC Microprocessor User's Manual* authored by Motorola Inc. and the International Business Machines Corporation, published April 1994 and incorporated entirely herein by reference.

Execution unit 106, on the other hand, represents an execution unit with logic for executing a translated instruction comprising the functions of a plurality of conventional, pre-translation object-level instructions. Execution unit 106 may also execute conventional integer, floating-point or branch instructions.

Figure 4:
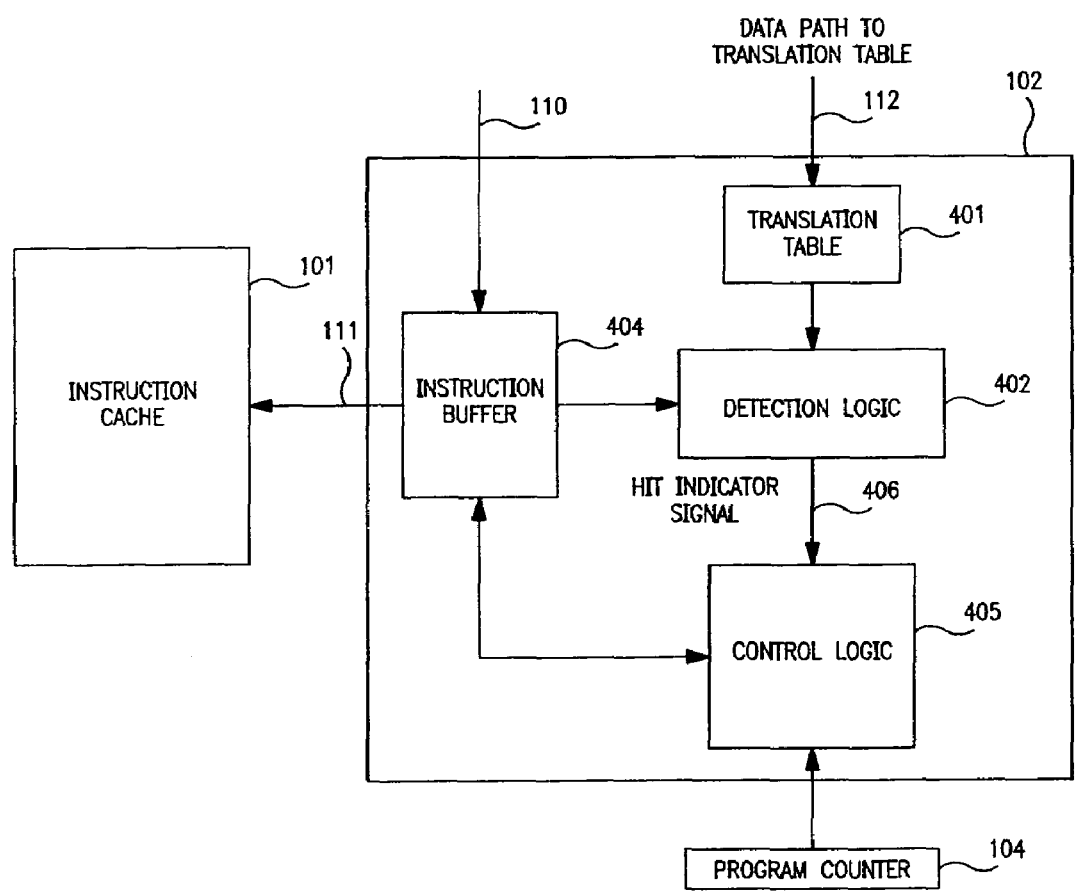
FIG. 4 shows a functional block diagram of translation logic for detecting and translating suitable instructions in an object-level instruction stream.

The translated instructions which are executable by the execution unit 106 are generated using a translation table 401, as illustrated in FIG. 4. FIG. 4 shows translation logic 102 of the embodiment shown in FIG. 1 in greater detail. Translation table 401 comprises a list of conditions for applying to instructions in the incoming object-level stream. Combinations of instructions in the incoming stream which meet the conditions listed in translation table 401 are suitable candidates for translation. Translation table 401 may be hardwired, loaded at power-up time (i.e., during IPL or boot) or may be dynamically loaded by an operating system or service processor over data bus 112.

Entries in translation table 401 are determined by analysis of a processor instruction set to determine what instructions, under what conditions, are readily combinable, based on operand interdependencies, into a single instruction for dispatch to a single execution unit to facilitate increased processing efficiency. Thus, the translation table 401 will vary depending upon what particular instruction set and processor architecture it is designed for. Accordingly, execution unit 106 will vary in design to allow for the execution of translated instructions corresponding to the translation table 401.

Referring now to FIG. 4, in general operation the translation logic 102 receives object-level instructions from a memory (not shown) in instruction buffer 404 over instruction bus 110. The memory may include not only main storage but also hierarchical caches above the instruction cache 101 level. The instructions are fetched from memory when an instruction required by a program under execution by the processor is not present in the instruction cache 101 (a "cache miss"). Instructions are fetched in units of "lines". For example, a cache line may comprise 128 bytes constituting 32 4-byte instruction words. The instructions are analyzed by detection logic block 402 which detects candidate instructions for translation. Detection logic 402 uses translation table 401 to perform detection based on information in the table.

In an embodiment, detection logic 402 may be a hardwired comparator capable of detecting two sequential instructions with a specific format. When an instruction pair matches an allowable combination as reflected in translation table 401, detection logic 402 generates a hit indicator signal 406 to notify control logic 405 of the match. Control logic 405 then generates a translated instruction in accordance with translation rules corresponding to the matching table entry, and replaces the candidate instructions in instruction buffer 404 with the translated instruction using positional information supplied by the program counter 104.

The contents of the instruction buffer 404 including translated instructions, if any, are then transferred over bus 111 to the instruction cache 101. The translated instructions are subsequently dispatched by the dispatch unit 103 to execution unit 106. The translation rules used by control logic 405 to format the instruction ensure that the instruction is recognized and executable by the execution unit 106.

Figure 5A:
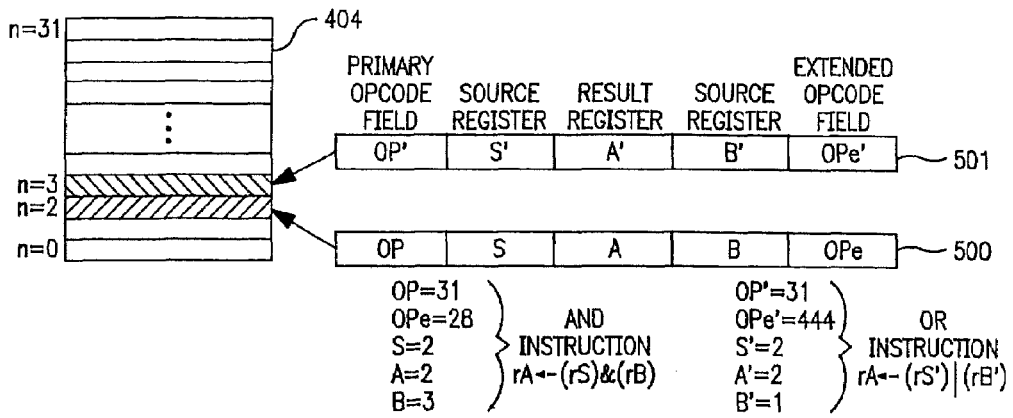
FIG. 5A shows an example of an instruction buffer containing pre-translation instructions, including a pair which qualify for translation.

An illustrative example of a pair of conventional instructions which are translated according to the present invention will now be discussed. FIG. 5A shows an example of a pair of conventional instructions which may be advantageously combined to form a translated instruction. The instruction format of the PowerPC® instruction set is used in this example for purposes of illustration.

In FIG. 5A, instruction buffer 404 is shown having just been loaded with a 32-word cache line. The cache line happens to include conventional PowerPC® instructions 500 and 501 at buffer locations 2 and 3, respectively. Referring now to instructions 500 and 501, these constitute logical instructions having a primary opcode field (OP, OP'), a source register field (S, S'), a result register (A, A'), a second source register field (B, B'), a secondary or extended opcode field (OPe, OPe'), and a return code field (not shown). The designations OP, OP', S, S', A, A', B, B', OPe and OPe' are arbitrary and used for the purpose of distinguishing between the fields in the pair of instructions.

When the above-described fields have the values shown in FIG. 5A, instructions 500 and 501 constitute a logical AND and a logical OR operation, respectively. That is, when the primary opcode OP=31 and the extended opcode OPe=28, an AND operation is specified. When the primary opcode OP'=31 and the extended opcode OPe'=444, an OR operation is specified. The specific source and result registers are arbitrary but in this example make instructions 500 and 501 suitable candidates for translation.

The notation associated with the AND instruction 500 (rA <-- (rS)&(rB)) indicates that the contents of register S are to be ANDed with the contents of register B and the result is to be stored in register A. In this example, as shown, S=2, A=2, and B=3. Similarly, the notation associated with the OR instruction 501 (rA' <-- (rS')|(rB')) indicates that the contents of register S' are to be ORed with the contents of register B' and the result is to be stored in register A'. Here, S'=2, A'=2, and B'=1.

Figure 5B:
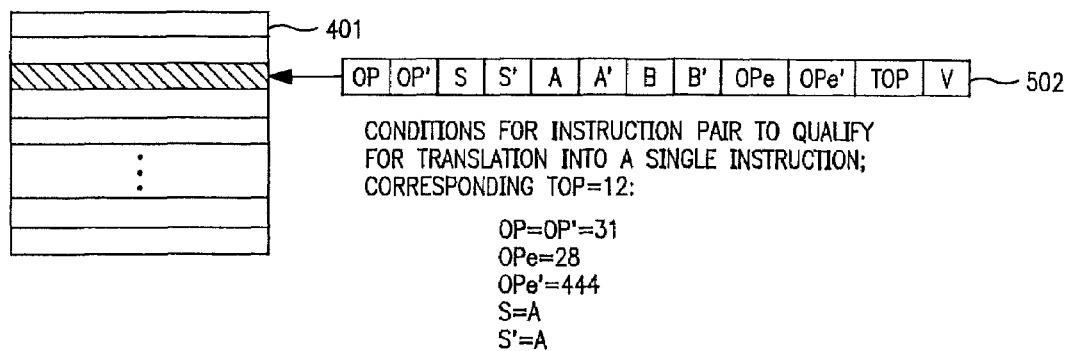
FIG. 5B shows a translation table with an entry corresponding to the instruction pair in FIG. 5A.

Translation table 401 is used in translating instructions 500 and 501. Translation table 401 represents a set of conditions that must be met by two or more conventional object-level instructions in order to qualify for translation. An example of a possible format for an entry in translation table 401 is shown in FIG. 5B. The fields in table entry 502 correspond to fields in the incoming instructions to be tested for specified contents and relationship. When the corresponding fields in the conventional instructions meet the required conditions associated with table entry 502, a translated instruction is generated by control logic 405 in accordance with translation rules corresponding to the associated table entry. The translation rules are used to generate an instruction having a format executable by the execution unit 106. The TOP field in table entry 502 specifies a translated opcode recognizable by execution unit 106 and identifies the translation rules for formatting a particular translated instruction, while the V field contains a validity bit for enabling or disabling selected translated instructions.

To detect pairs of logical instructions such as 500 and 501, for example, the conditions associated with table entry 502 could be specified as shown in FIG. 5B. That is, when OP=OP'=31, OPe=28 and OPe'=444 for a pair of instructions, a first condition has been met, i.e., the instructions are logical instructions, with the first instruction being an AND instruction and the second instruction being an OR instruction. When, further, A'=A and S'=A for that pair of instructions, they are suitable candidates for translation into a single instruction for dispatch to execution unit 106.

The foregoing can be observed by noting that the two instructions are both logical operations, and thus can be processed by an execution unit faster than, for example, an arithmetic operation or an operation that accesses memory. Further, the instructions have a common result register, and the source register S' for the second instruction is the result register A from the previous instruction. This means that an execution unit does not need to store an interim result from the first instruction or write to two different result registers. Thus, the two instructions can be collapsed into a single translated instruction which can be executed by a single execution unit designed to have such capability, which is readily available in existing technology.

Figure 6:
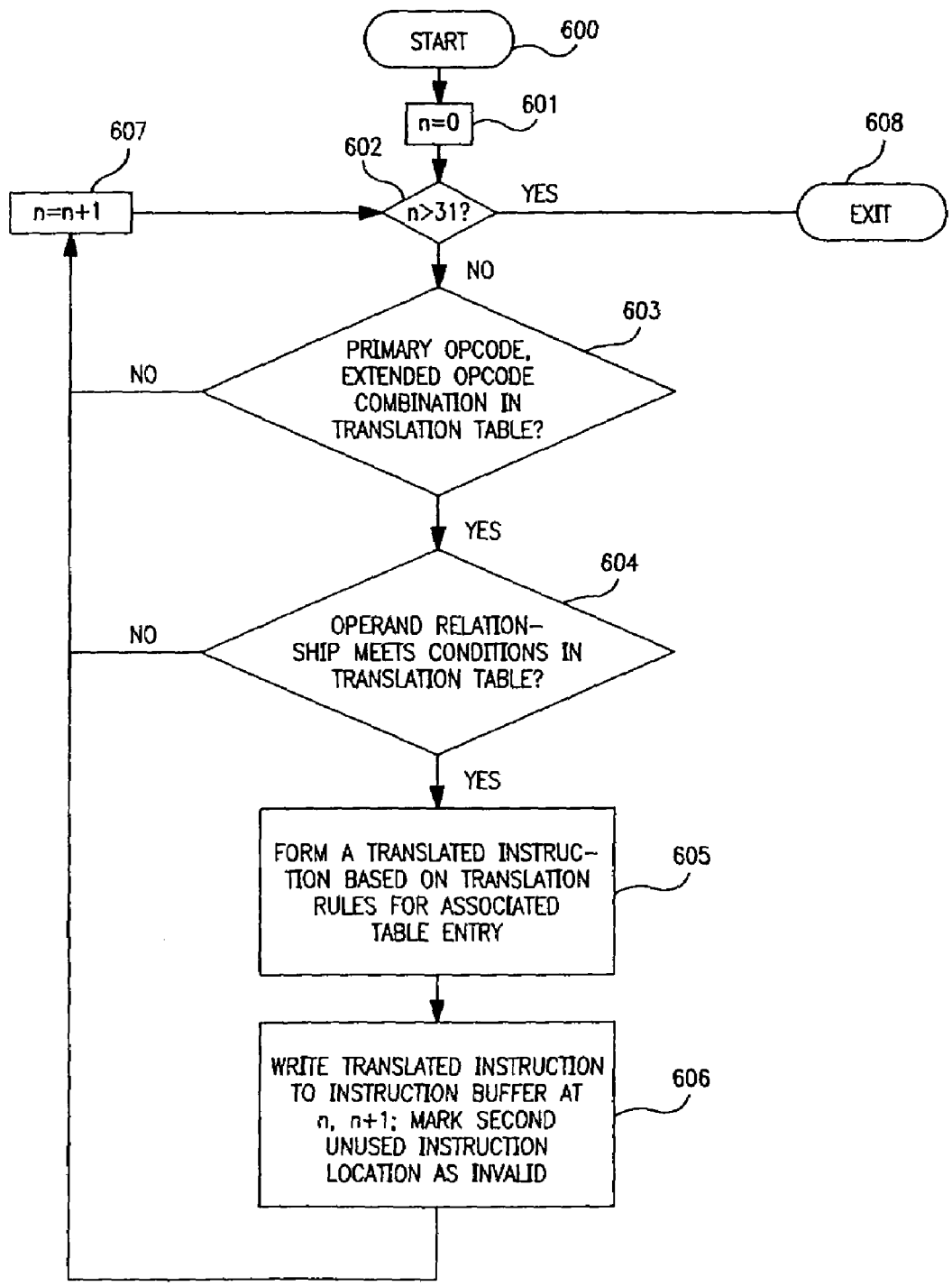
FIG. 6 shows a flow diagram of a sequence of steps for translating instructions in an object-level instruction stream.

A flow diagram for a possible sequence of steps to generate a translated instruction from conventional instructions 500 and 501 is shown in FIG. 6. FIG. 6 represents a sequence of steps for analyzing the pre-translation contents of instruction buffer 404 (FIGS. 4 and 5A) to detect and translate suitable candidate instructions.

The sequence begins with "START" block 600. Next, block 601 initializes a counter for stepping through the 32-word instruction buffer 404 in ascending order. Decision block 602 represents a test for whether the entire instruction buffer has been processed; if not, the sequence continues with decision block 603, and otherwise the sequence is exited as shown by block 608.

Block 603 represents the step of checking for a match between the primary opcodes (OP and OP') and extended opcodes (OPe and OPe') in a pair of instructions, and a table entry in the translation table 401. If there is no match, there is no corresponding translated instruction for the instruction pair. Consequently, the next instruction word in the buffer 404 is tested against one of the previous pair, as shown by block 607.

If there is a match, the instruction pair may qualify for translation, provided the relationship between the operands meets the conditions of the translation table. Decision block 604 illustrates the step of testing the operand relationship.

If the operand relationship meets the conditions in the translation table, a translated instruction is generated by control logic 405 based on the translation rules for the associated table entry, as shown in action block 605. If not, the next instruction word in the buffer 404 is tested, as shown in block 607.

Block 606 shows the step of replacing the qualifying instructions by writing the translated instruction to the instruction buffer 404 at the location corresponding to one of the qualifying candidate instructions. The other location is marked as invalid, as explained below.

The translation operation is compressive; i.e., the translated instruction has the same length as one conventional instruction, so that it can fit in caches and buffers required by the processor architectures of the conventional instructions. Thus, the location in instruction buffer 404 corresponding to one of the qualifying pair of instructions is unused. This unused location is marked as invalid to account for the possibility of a branch to that instruction in subsequent code. The step of marking the second unused instruction location as invalid is shown in action block 606. In the event of a branch to the location in the instruction cache 101 which has been marked as invalid due to a translated instruction having been generated for an instruction pair, the cache line is treated as invalid and reloaded from memory without generating translated instructions.

Alternatively, if needed, the second unused location could be utilized for storing extensions of a translated instruction. Extensions of the instruction cache line are known, for example to include pre-decode logic to speed instruction decoding.

Figure 5C:
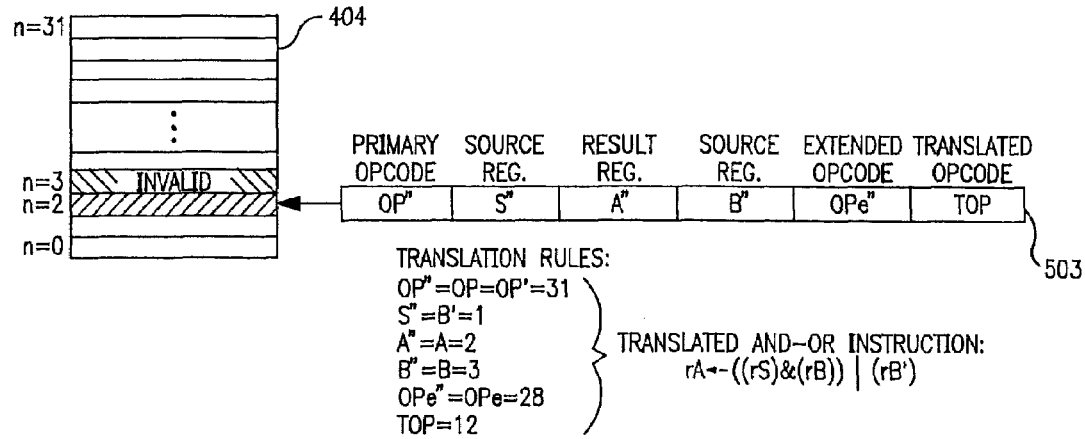
FIG. 5C shows the instruction buffer of FIG. 5A containing post-translation instructions, including a translated instruction corresponding to the qualifying instruction pair of FIG. 5A.

FIG. 5C shows instruction buffer 404 after the steps shown in FIG. 6 have been applied to the example shown in FIG. 5A. Conventional instructions 500 and 501 at buffer locations n=2 and n=3, respectively, have been replaced by translated instruction 503. Conventional instruction 500 has been replaced by translated instruction 503 at buffer location n=2, and conventional instruction 501 has been marked as invalid at buffer location n=3.

Translated instruction 503, as shown in FIG. 5C, is assembled by control logic 405 based on translation rules for the associated table entry 502 in translation table 401. Translated instruction 503 comprises a composite of fields from the qualifying candidate instructions along with a translated opcode TOP (here, TOP=12) identifying the translated instruction as such to the dispatch unit 103, and supplying operational information to the translated instruction execution unit 106.

The notation shown in FIG. 5C for translated instruction 503 represents a translated AND-OR instruction. The contents of register B are ANDed with the contents of register S, the result is ORed with the contents of register B' and the result is stored in register B. In terms of the original conventional instructions 500 and 501, registers S and B from instruction 500 are ANDed together, the result is ORed with register B' from instruction 501 and the result is stored in register A from instruction 500.

The post-translation instructions illustrated in FIG. 5C represent an improvement in processor performance which is enabled by the present invention. Translated instruction 503 can be dispatched to a single execution unit as compared to the pre-translation instructions 500 and 501 shown in FIG. 5A, which could not otherwise be dispatched together, freeing other execution units for simultaneous multiple instruction processing and thereby extending the number of instructions which can be dispatched per cycle. Although only one translated instruction is shown in the example of FIG. 5C, this number could be greater depending upon how many instructions qualifying for translation are detected in an instruction stream. The translation is performed on object-level instructions at the instruction cache level or lower, avoiding the need for re-compilation of code.

Figure 7A:
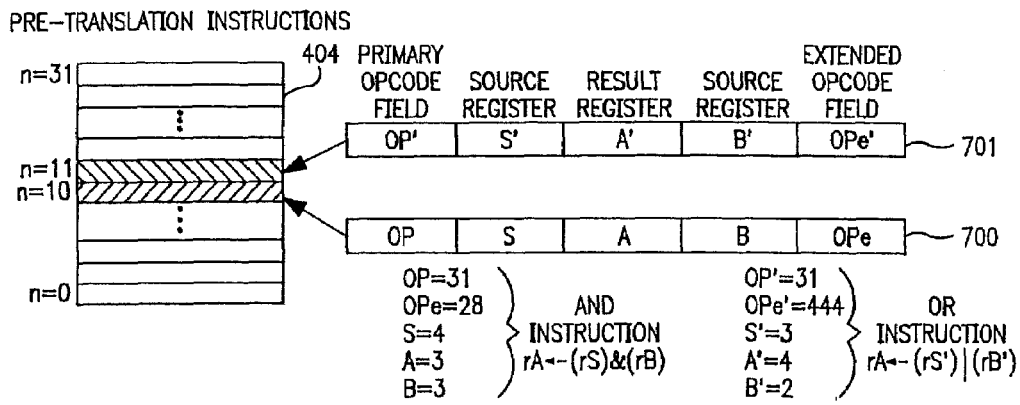
FIGS. 7A through 7C correspond to FIGS. 5A through 5B, using a different example of a qualifying pair of pre-translation instructions.
Figure 7B:
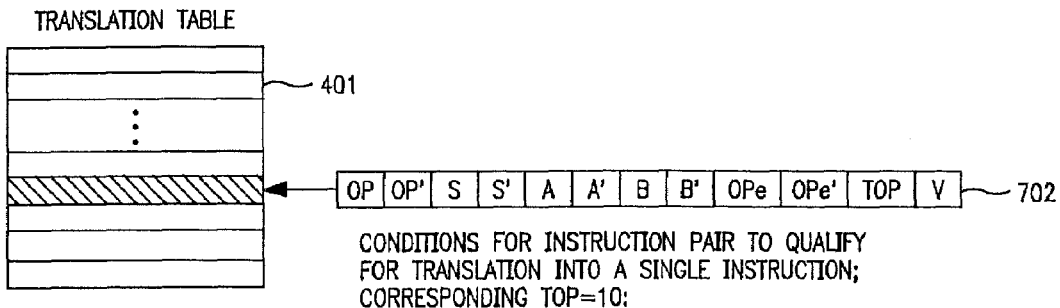
Figure 7C:
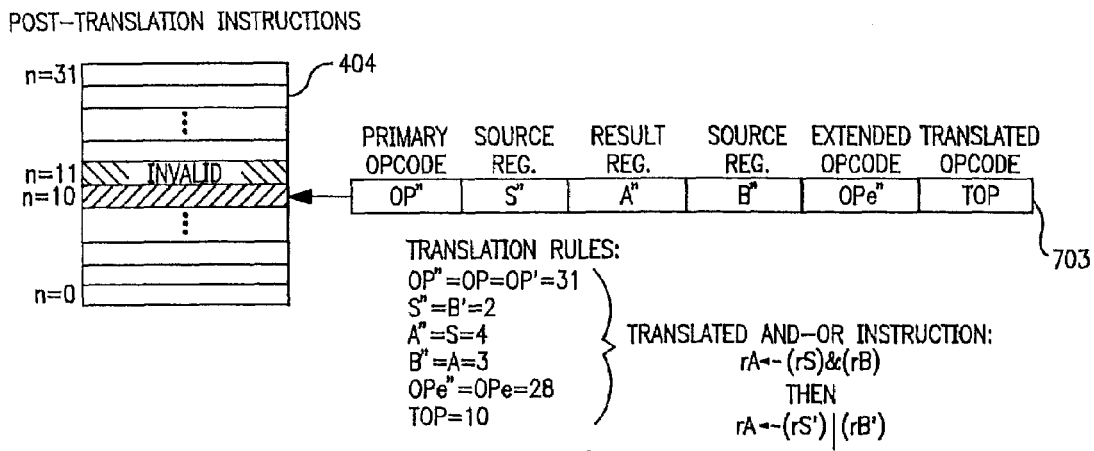

FIGS. 7A-7C show another example of generating a translated instruction derived from combining conventional instructions in an instruction stream. FIG. 7A shows pre-translation instructions in buffer 404 which happen to include a conventional AND instruction 700 and a conventional OR instruction 701 at locations n=10 and n=11, respectively. In instructions 700 and 701, result registers A and A' are different (as opposed to the example of FIG. 5A).

Conditions for an instruction pair to qualify for translation into a single instruction are shown in FIG. 7B. FIG. 7B shows a table entry 702 in translation table 401, requiring that a first instruction is an AND instruction having the value of register B being the same as the value of register A. The second instruction must be an OR instruction having a source register S' equal to the result register A of the first instruction, and having a result register A' equal to the source register S of the first instruction. In this example, A and A' fields of the instructions need not be the same. Translation opcode TOP has the value of 10 to identify the translated operation and translation rules for formatting.

Comparing instructions 700 and 701 with the conditions corresponding to translation table entry 702 show that they meet the conditions. Accordingly, after the pre-translation instructions in buffer 404 as shown in FIG. 7A are processed by a sequence of steps such as illustrated in FIG. 6, post-translation instructions in buffer 404 appear as shown in FIG. 7C. Instruction 700 has been replaced at location 10 by translated instruction 703, and location n=11 has been marked as invalid.

Translated instruction 703 has been assembled by control logic 405 based on translation rules for the associated table entry 702 in translation table 401. Translated instruction 703 comprises a composite of fields from the qualifying candidate instructions along with a translated opcode TOP (TOP=10). The translated instruction execution unit 106 has the capability of storing two result registers in a cycle in order to execute the translated instruction generated.

Figure 8A:
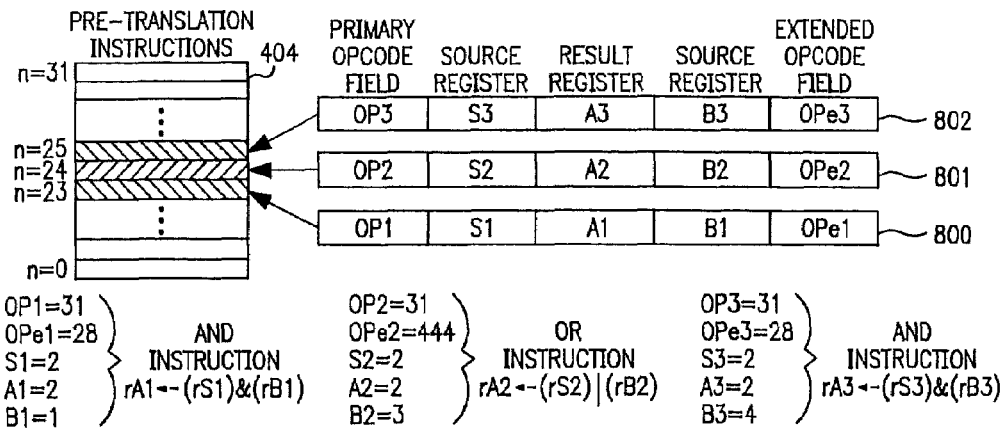
FIG. 8A shows an instruction buffer containing pre-translation instructions, including an instruction triplet which qualify for translation.
Figure 8B:
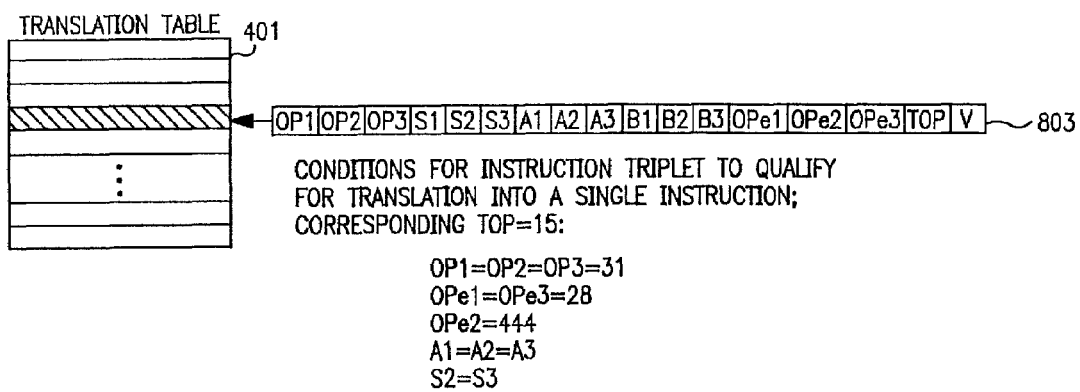
FIG. 8B shows a translation table including an entry which corresponds to the instruction triplet of FIG. 8A.
Figure 8C:
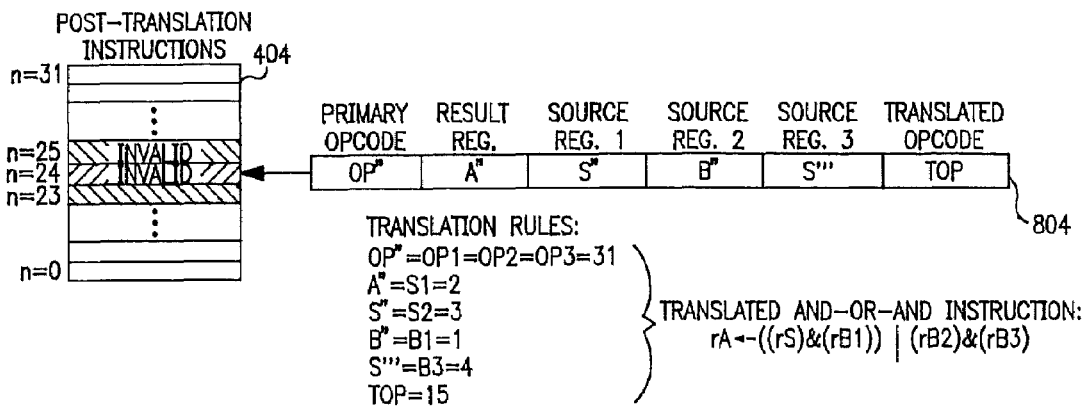
FIG. 8C shows the instruction buffer of FIG. 8A containing post-translation instructions, including a translated instruction corresponding to the instruction triplet of FIG. 8A.

FIGS. 8A-8C show another example of combining conventional instructions into a single translated instruction. In this example, three conventional instructions 800, 801 and 802 meet the conditions corresponding to translation table entry 803, i.e., that all A fields and the second and third S fields must be the same. The instructions are combined into a single translated instruction 804. Translated opcode TOP=15 is interpreted by the translated instruction execution unit 106 as an instruction for performing three sequential operations, specifically, AND-OR-AND.

Figure 9A:
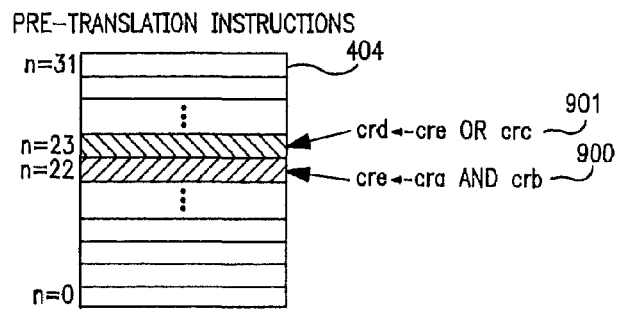
FIG. 9A shows an instruction buffer containing pre-translation instructions, including CRL instructions which qualify for translation.
Figure 9B:
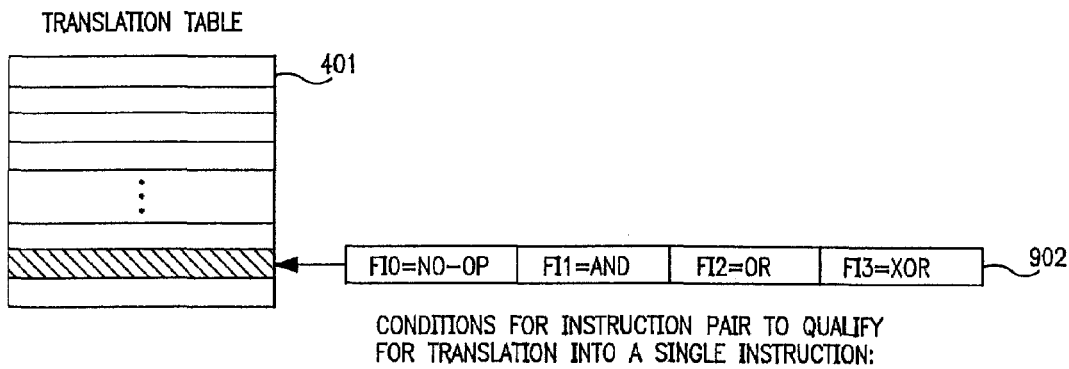
FIG. 9B shows a translation table including an entry which corresponds to the CRL instructions of FIG. 9A.
Figure 9C:
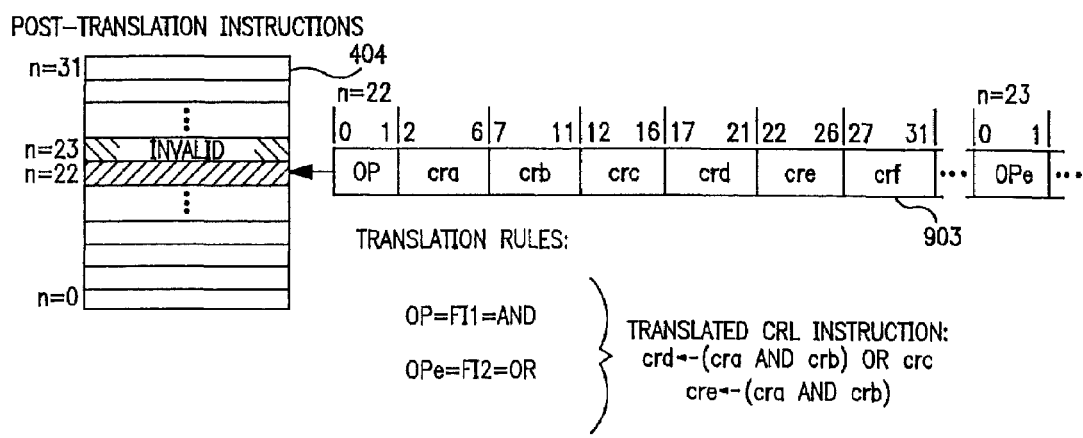
FIG. 9C shows the instruction buffer of FIG. 9C containing post-translation instructions, including a translated instruction corresponding to the CRL instructions of FIG. 9A.

In FIGS. 9A-9C, an example of combining PowerPC® Condition Register Logical (CRL) instructions is shown. In PowerPC®, the condition register holds 8 sets of 4-bit condition fields. A CRL instruction comprises a 5-bit field specifying a bit in the condition register to be tested for "on" or "off" status, typically, to resolve an "if-then-branch" condition arising in a program sequence.

In conventional implementations, CRL instructions are serialized and dispatched one at a time, since the results of one instruction can affect the operands of subsequent instructions. In an embodiment of the present invention, a plurality of sequential conventional CRL instructions are translated into a single translated instruction which is dispatched to a specialized branch processing unit designed with the capability of executing the translated instruction.

FIG. 9A shows an example of a pair of conventional pre-translation CRL instructions 900 and 901 in buffer 404 at locations n=22 and n=23, respectively. In this example, "cra" represents a 5-bit operand specifying a bit "a" in the condition register, while "crb" specifies a bit "b", and so on. Thus, in instruction 900, bit "a" of the condition register is ANDed with bit "b", and the result is stored in bit "e" of the condition register. Subsequently, in instruction 901, bit "e" is ORed with bit "c" and the result is stored in bit "d".

Referring now to FIG. 4A, translation logic 102 detects the CRL instructions 900 and 901 and combines the functions of these instructions into a single translated instruction using translation rules corresponding to information in translation table 401.

An example of a possible translation table entry 902 for the above application is shown in FIG. 9B. The table could provide a set of function identifiers "FI" (in this example, there are 4 function identifiers, FI0-FI3) corresponding to CRL operations. When detection logic 402 detected CRL instructions having operations matching function identifiers as shown table entry 902, control logic 405 would generate a translated instruction combining these operations, and replace the conventional CRL instructions in buffer 404. The translated instruction would then be dispatched to execution unit 106, which in this embodiment would be a specialized branch processing unit.

FIG. 9C shows post-translation instructions in buffer 404. Instruction 900 has been replaced at location 22 by translated instruction 903, and location n=23 has been marked as invalid. Translated instruction 903 shows a possible format for a translated instruction corresponding to the conventional CRL instructions of FIG. 9A. The instruction comprises an OP field and an OPe field corresponding to the function identifiers matching the operations of instructions 900 and 901, along with fields corresponding to the CRL operands. In this example, the "crf" field is unused, but demonstrates that six 5-bit operands could be combined into a single translated instruction.

FIG. 9C also shows an example of using the second buffer location (here, location n=23) for storing an extension of a translated instruction. Note that the OPe field, which corresponds to FI2, is stored at bits 0-1 of buffer location n=23.

Since in PowerPC®, CRL instruction operands are small (1 bit each), they represent highly suitable candidates for translation as described above. By combining multiple branch condition tests represented by a sequence of CRL instructions into a single instruction which is dispatched to a single branch processing unit for execution in a single clock cycle, significant efficiencies in branch processing can be realized.

While in the foregoing the invention has been discussed in terms of examples using logical instructions, other applications are possible. The translation table and detection and control logic could be designed to detect and translate other or additional selected instructions. The detection and translation would be performed as described above, at the instruction cache level or lower, thereby increasing the efficiency of an instruction stream without requiring re-compilation of code. For example, logical instructions could be combined with branch instructions in a single translated instruction, or a logical instruction could be combined with a store instruction in a single translated instruction. Or, for example, arithmetic operations, such as an integer instruction and a floating point instruction having shared operands, could be combined. A translated instruction execution unit would be designed with corresponding capabilities and integrated into a conventional system as described in the foregoing.

Additionally, the invention could be applied to an instruction stream where candidate instructions for translation are not necessarily sequential, but instead separated by one or more unrelated instructions. If the unrelated instructions were not dependent on the results of one or more of the candidate instructions and did not modify a candidate resource, for instance, the candidate instructions could still be translated as described above. The translated instruction would include a field providing information to preserve program order.

If candidate instructions were not sequential, a translation operation would produce a translated instruction replacing two or more candidate instructions, as well as a location marked as invalid, as described in the preceding. However, these would be separated by one or more untranslated instructions, in contrast to the case of sequential candidate instructions.

Undesired consequences may result from, for example, branches into a range of instructions which includes a location marked as invalid due to a translation operation, or from, for example, an external interrupt during the execution of such a range of instructions. Accordingly, in the preferred embodiment a range of instructions which includes translated instructions and associated locations marked as invalid is treated as a unit in which all instructions must either execute, or be aborted if necessary due to external events, as a group or whole. If it is necessary to abort such a unit of instructions, they are replaced with the original untranslated instructions to be dispatched without translation.

An additional application of the translation logic 102 as described above is to protect program code from unauthorized uses. In such an application, translation table 401 functions as a security code which defines operations on instructions at the object level. Programs designed to be protected from unauthorized use incorporate encoded instructions are written using the security code as a reference, knowing that at execution time, the translation table 401 will be used to decode the encoded instructions. Without being decoded by the translation logic 102, the encoded instructions produce unpredictable results, rendering the program unusable for its intended purpose and thereby discouraging the unauthorized copying or other unauthorized use of the program.

In an example embodiment, translation logic 102 replaces a selected instruction field in an encoded instruction at the instruction cache level or lower with a predetermined substitute instruction field. The selected instruction field and the corresponding predetermined substitute field pair are one of a group of such pairs constituting a security code.

Figure 10A:
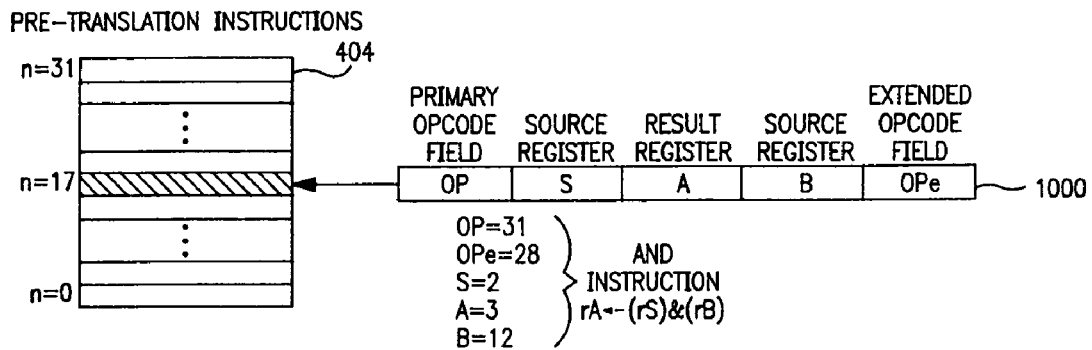
FIG. 10A shows an instruction buffer containing pre-translation instructions, including an instruction which has been encoded and qualifies for decoding.
Figure 10B:
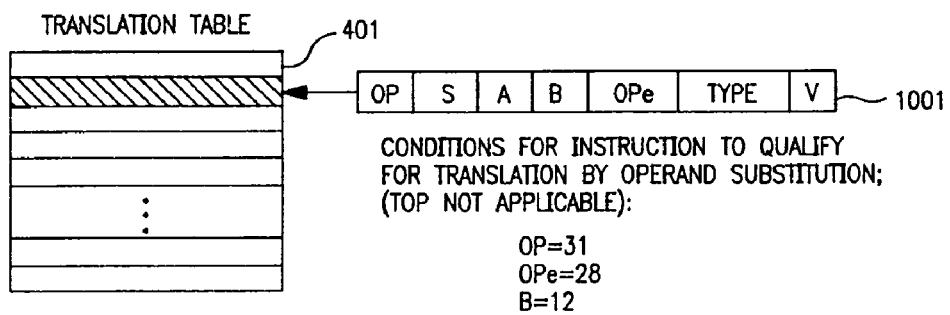
FIG. 10B shows a translation table including an entry corresponding to the encoded instruction shown in FIG. 10A.
Figure 10C:
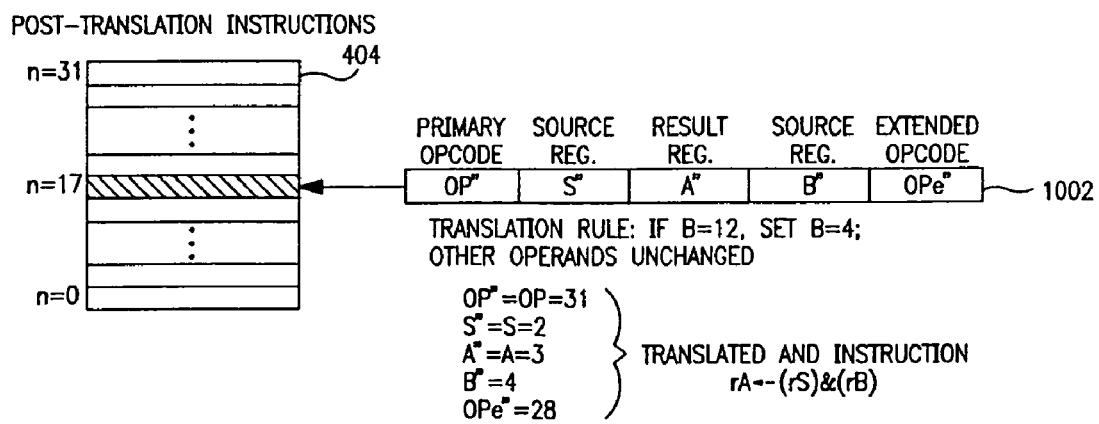
FIG. 10C shows an instruction buffer containing post-translation instructions, including the decoded instruction corresponding to the encoded instruction shown in FIG. 10A.

An example of the foregoing application is illustrated in FIGS. 10A-10C. In FIG. 10A, pre-translation instructions are shown in instruction buffer 404, including an encoded AND instruction 1000 at location n=17.

FIG. 10B shows translation table 401 with entry 1001. Table entry 1001 has corresponding conditions for an encoded instruction to qualify for translation into a decoded format by field substitution. Table entry 1001 requires an instruction to be an AND instruction with register B=12. The "Type" field identifies the table entry as an entry which decodes encoded instructions.

Instruction 1000 meets the conditions for table entry 1001. Accordingly, FIG. 10C shows post-translation instructions in instruction buffer 404 after processing by a sequence of steps similar to that illustrated in FIG. 6. Instruction 1000 has been replaced by instruction 1002. The translation rule corresponding to table entry 1001 causes register B to be assigned the value "4" if register B contains the value "12"; the other operands are left unchanged.

Instruction 1002 does not require execution unit 106 for execution, since in format it is a conventional instruction, although its content has been altered to decode it. Accordingly, no translation opcode (TOP) is required.

A translation table 401 including entries such as entry 1001 as shown in FIG. 10B would be encrypted and shipped to a customer with a secure key using known methods, along with a protected program written using the translation table. The encrypted translation table 401 would be necessary in order to execute the protected program, since without the necessary substitutions, the protected code would produce unintended results. The protected code would be difficult to reverse engineer without knowledge of the substitutions being performed using the encrypted translation table 401. Alternatively to selectively substituting operands in an instruction stream, a translation table could be used to selectively insert additional instructions, selectively modify the operation performed by an instruction, selectively no-op an instruction, or the like.

A further application of the invention is to modify code designed to execute in an existing processor architecture to better utilize advancements in hardware capability represented by a newer, more efficient processor architecture. For example, 8-bit legacy code being run on an architecture providing for 16-bit operands could be intercepted in an instruction cache and converted to the more efficient 16-bit format. Since the invention operates on object-level code, this would avoid the need to recompile the legacy code into instructions that use the 16-bit architecture.

For example, a legacy instruction sequence of an "add" of 8 bits followed by an "add-with-carry" of 8 bits could be combined into a single 16-bit instruction of a upgraded architecture.

Figure 11:
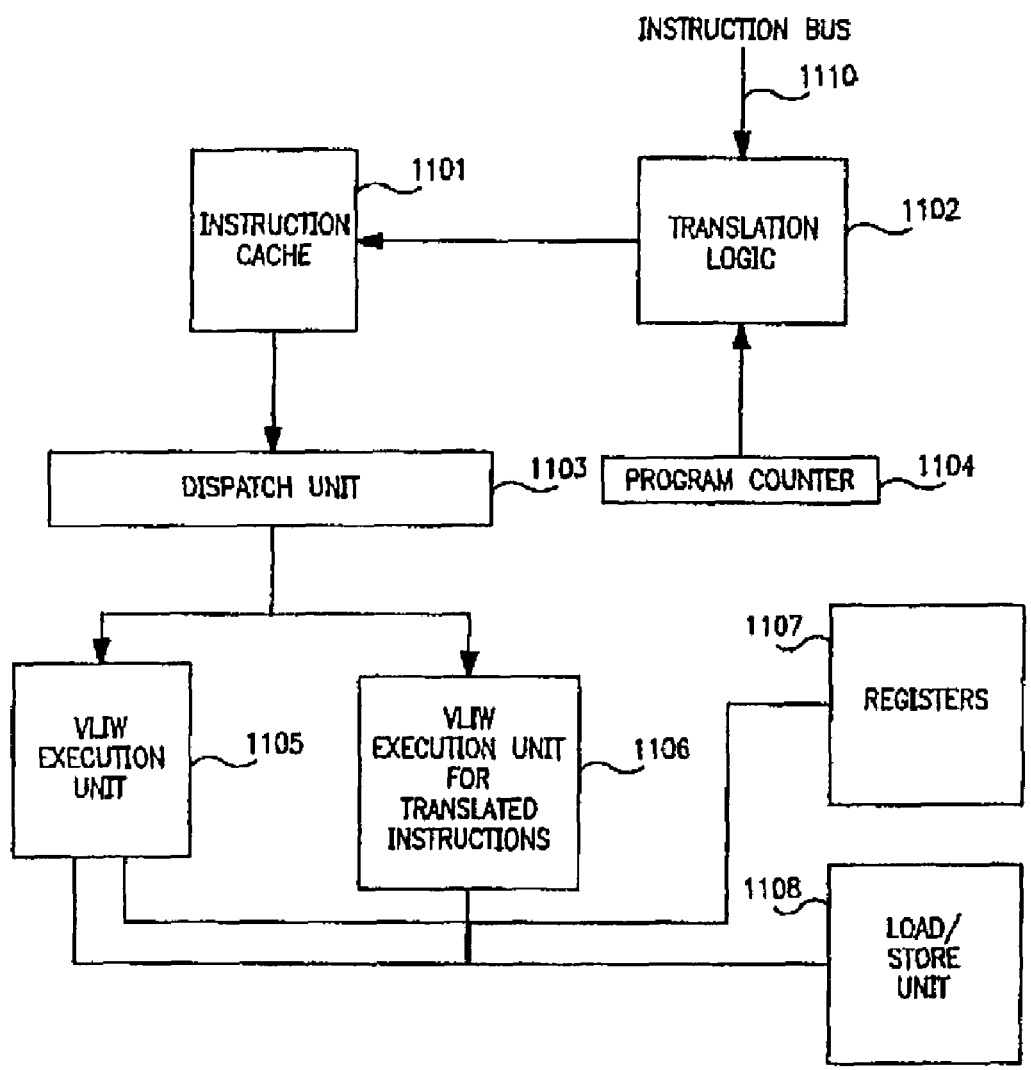
FIG. 11 shows an embodiment of the invention which includes execution units with VLIW instruction execution capabilities.

Similarly, legacy code could be dynamically converted into a VLIW format. FIG. 11 shows a high-level functional block diagram of an embodiment of the invention for a VLIW application. FIG. 11 depicts a superscalar RISC-architected computer processor which comprises multiple execution units for processing multiple pipelines. Execution unit 1105 can execute both legacy code and VLIW instructions. However, to the extent execution unit 1105 is used to execute legacy code, its VLIW capabilities are underutilized. Execution unit 1106, on the other hand, can execute both legacy code and VLIW code, as well as appropriate legacy code translated into a VLIW format using techniques similar to those taught previously.

Figure 12:
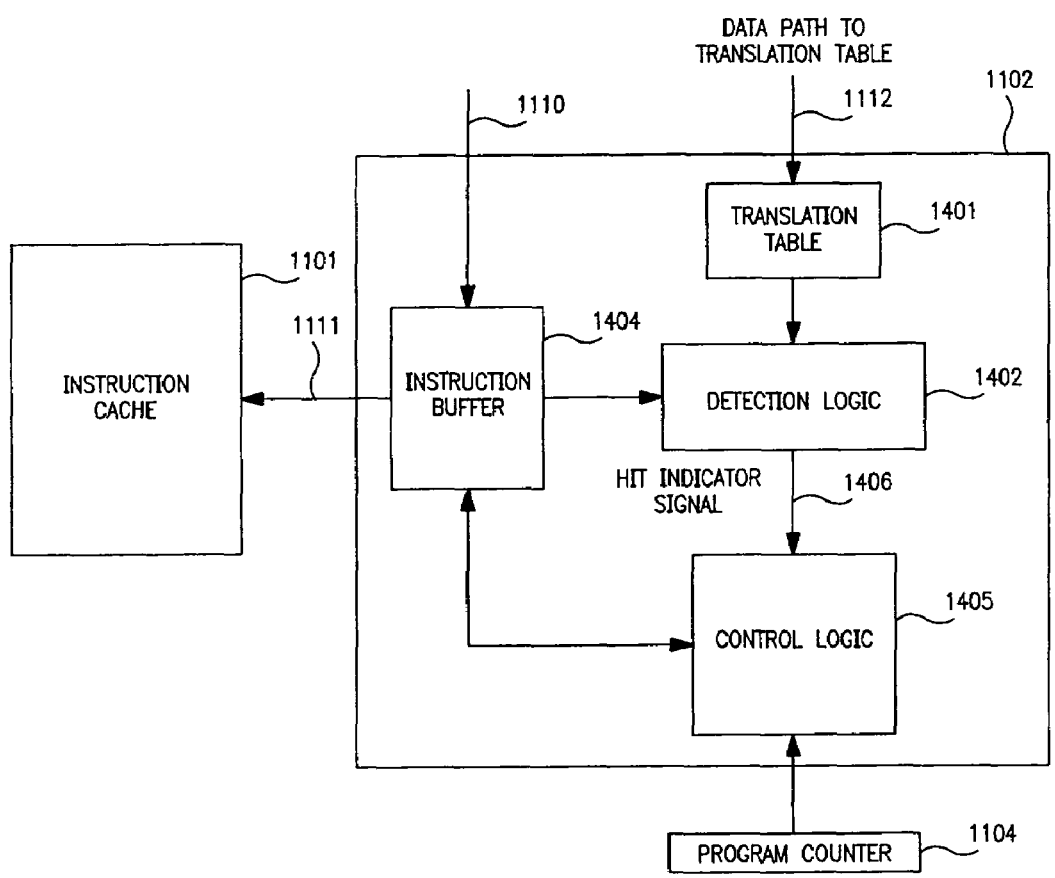
FIG. 12 shows a functional block diagram of translation logic for detecting legacy instructions in an instruction stream.

FIG. 12 shows the translation logic block 1102 in greater detail. Translation logic 1102 corresponds in function to translation logic 102 as shown in FIG. 4, except that translation logic 1102 detects and translates legacy instructions into VLIW instructions.

Referring now to FIGS. 11 and 12, in the general operation of the processor, object-level computer instructions are transferred from a memory (not shown) over instruction bus 1110. When the processor is in a mode for executing legacy instructions, the object-level instructions comprise legacy instructions. The object-level instructions are received by translation logic 1102. Translation logic 1102 comprises detection logic 1402 for detecting object-level legacy instructions in instruction buffer 1404, based on information in a translation table 1401. The information in translation table 1401 comprises conditions for legacy instructions to qualify for translation into a [wide-word] VLIW format instruction. Translation table 1401 is loaded via data path 1112. Translation logic 1102 further comprises control logic 1405 which assembles the VLIW format instructions from the detected legacy instructions, using translation rules in the translation table, for execution on the execution unit 1106.

The translation logic 1102 analyzes the incoming instruction stream and generates translated VLIW instructions from suitable legacy instructions in the original instruction stream, if any occur. Program counter 1104 tracks the location of each instruction. Control logic 1405 replaces the legacy instructions with translated wide-word instructions using the positional information supplied by the program counter 1004, and transmits both unaltered instructions and translated instructions over instruction bus 1011 to the instruction cache 1101.

The dispatch unit 1103 receives instructions from the instruction cache 1101. Dispatch unit 1103 includes logic for determining what type of execution unit is required by a particular instruction, and dispatches instructions to execution units 1105 and 1106 accordingly. Execution units 1105 and 1106 access general purpose registers 1107 and load/store unit 1108 to carry out the execution of instructions.

Figure 13A:
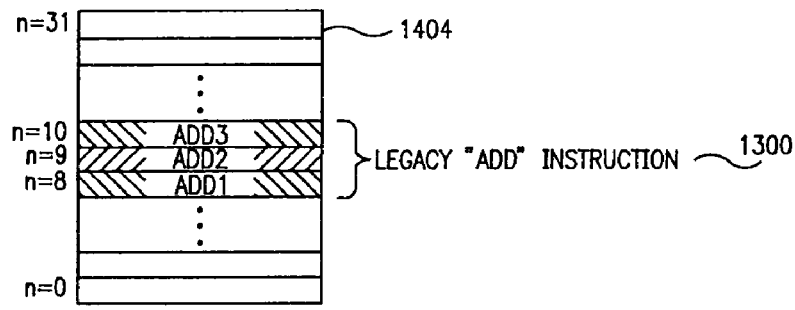
FIG. 13A shows an instruction buffer containing pre-translation legacy instructions.

An example of upgrading legacy code into a VLIW instruction word format as described above is shown in FIGS. 13A-13C. FIG. 13A shows pre-translation legacy instructions having just been loaded into instruction buffer 1404 in translation logic block 1102. The instructions happen to include a legacy "add" instruction 1300 at buffer locations n=8, 9 and 10.

Typically, as shown in FIG. 13A, a source-level add instruction breaks down into multiple object-level instructions to propagate a carry. Thus, "Add1", "Add2" and "Add3" as shown in FIG. 13A represent three object-level instructions required to perform a source-level add instruction which entails propagation of a carry. In the absence of translation to an upgraded wide-word format, the object-level instructions "Add1", "Add2" and "Add3" would require three execution cycles in order to complete the add operation.

Figure 13B:
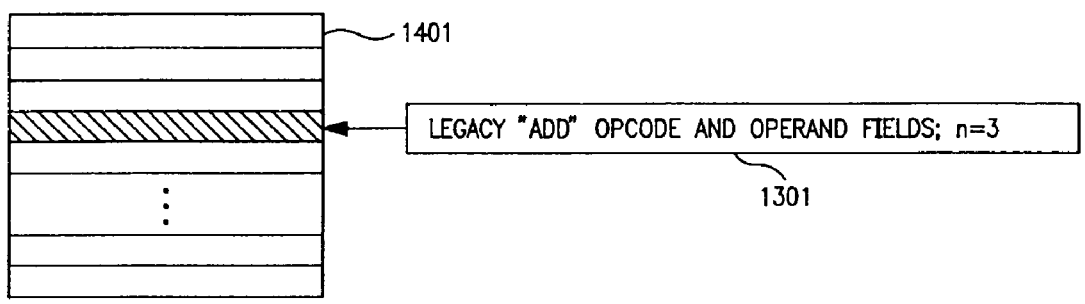
FIG. 13B shows a translation table including an entry corresponding to the legacy instructions in FIG. 13A.

FIG. 13B shows an example of a possible entry 1301 in translation table 1401 which would be used by detection logic 1402, in a sequence of steps similar to that illustrated in FIG. 6 and described above, to detect legacy instructions for translation into an upgraded VLIW format. Table entry 1301 contains legacy "Add" opcode and operand fields for comparison by detection logic 1402 with instructions in instruction buffer 1404; the condition "n=3" requires that there are three object-level legacy instructions corresponding to the source-level add instruction.

The legacy "Add" instruction 1300 of FIG. 13A qualifies for translation according the conditions in table entry 1301. Accordingly, control logic 1405 builds a single VLIW instruction from the three legacy instructions which is executable on execution unit 1106, using translation rules associated with table entry 1401. The translation rule requires that the translated instruction provides controllability of the ALU on the legacy boundary, allowing the carry to propagate all the way through the VLIW instruction in a single clock cycle.

Figure 13C:
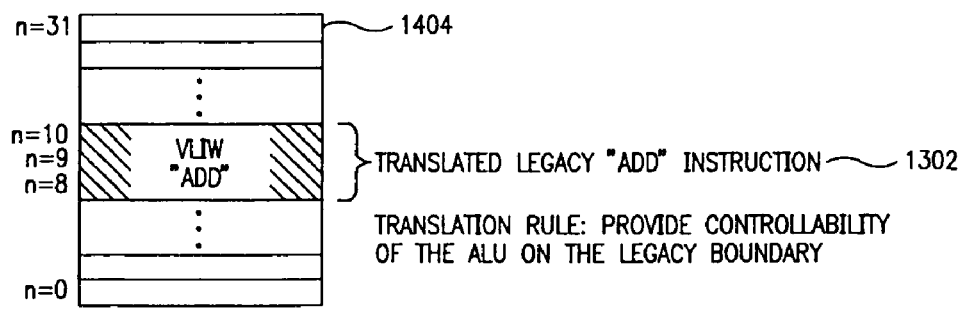
FIG. 13C shows the instruction buffer of FIG. 13A containing post-translation instructions, including a translated instruction corresponding to the legacy instructions in FIG. 13A.

FIG. 13C shows the post-translation instructions in instruction buffer 1404. The legacy add instruction 1300 comprising three object-level instruction has been replaced at buffer locations n=8, 9 and 10 by translated legacy add instruction 1302 having a VLIW format which is executable by execution unit 1106.

Other examples of legacy instructions which could be similarly treated are "add/subtract/AND" sequences and multiple register moves.

Other forms of VLIW exist such as Intel's IA64 architecture. Such an architecture could take the legacy Intel architected instructions and form them into groups useful in the IA64 architecture.

Translation of legacy code to an improved wider-word format could be made more efficient, for example, by providing a separate page of system memory for intermediate storage of translated legacy code. Some overhead may exist for the translation of legacy code during the instruction fetch phase, since this fetch phase may occur during an instruction starve phase. This overhead could be reduced by performing the translation of legacy code and writing the translated wider-word instructions to system memory along with cache addressing information. If a program being executed needs to reload this section of code from memory, they are already in wider-word format. The next time the instructions are fetched, the load can go directly into the cache and bypass the translation phase.

The post-translation instructions illustrated in FIG. 13C represent an improvement in processor performance which is enabled by the present invention. The translated legacy "Add" instruction 1302 can be dispatched to a single execution unit as compared to the three pre-translation legacy instructions which could not otherwise be dispatched together. Processor throughput is thereby increased by freeing other execution units for simultaneous multiple instruction processing. Although only one translated instruction is shown in the example of FIG. 13C, this number could be greater depending upon how many instructions qualifying for translation are detected in an instruction stream. The translation is performed on object-level instructions at the instruction cache level or lower, avoiding the need for re-compilation of legacy code.

Additionally, since it may not be possible in some cases for a wide-word processor to execute legacy code in its original format, the foregoing provides a means of utilizing the legacy code. Since, typically, the transition from legacy code to upgrade code is time-consuming and expensive, the ability to utilize legacy code on an upgraded processor provides market advantages.

The invention as described in the foregoing allows for considerable flexibility. For example, a bit in a register could be established to enable or disable translated instruction generation and execution for selected periods or states. Preferably, the translation logic used in each of the above-described embodiments is programmable and can be modified or re-loaded as desired to customize the logic to a specific processor architecture.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A computer processor comprising:
    a bus which transfers object-level instructions having a first format from a memory to an instruction cache in said processor for execution in multiple execution units;
    translation logic which generates translated instructions having a second format having multiple fields having contents that differ from those of said first format of said object-level instructions and replaces said object-level instructions with said translated instructions in accordance with positional information provided by a program counter; and
    a first execution unit of the multiple execution units which executes said instructions having the first format;
    a second execution unit of the multiple execution units that executes instruction having both the first format and the second format; and
    a dispatch unit coupled to the instruction cache that receives said object-level instructions having said first format from said bus; and said dispatch unit receives said object-level instructions having said second format to said execution unit, wherein said translation logic combines functions of two successive object-level instructions having said first format into a single translated instruction having said second format which is executed in the second execution unit and decreases the number of instructions to be executed and increases processing throughput, wherein said translation logic is coupled to said bus and to an instruction cache, and said translation logic receives said object-level instructions having said first format from said bus and transfers said translated instructions having said second format to said instruction cache.

2. The computer processor of claim 1 wherein said translation logic is selectably enabled or disabled for desired periods.

3. The computer processor of claim 1 wherein said translation logic is programmable.

4. The computer processor of claim 1 wherein said translation logic comprises:

a translation table comprising conditions to be met by said two successive object-level instructions for replacement by said translated instructions;

detection logic for detecting instructions meeting said conditions; and control logic for constructing said translated instructions from instructions detected by said detection logic, said control logic replacing said detected instructions with said translated instructions.

5. The computer processor of claim 4 wherein said detection logic comprises:

means for comparing said object-level instructions with entries in said translation table; and means for generating a detection signal to notify said control logic of object-level instructions meeting the conditions of said table entries.

6. The computer processor of claim 5 wherein said control logic comprises:

means for constructing said translated instructions in accordance with translation rules specific to said execution unit in response to said detection signal, said translation rules corresponding with entries in said translation table; and means for replacing said object-level instructions with said translated instructions.

7. The computer processor of claim 4 wherein said control logic replaces said detected instructions at first and second locations in an instruction cache, and wherein said first location contains said translated instruction, and said second location is marked as invalid.

8. The computer processor of claim 7 wherein in the event of a branch by a program to said second location, said instruction cache is reloaded from memory without generating translated instructions.

9. The computer processor of claim 1 wherein said first format conforms to a first processor architecture and said second format conforms to a second processor architecture.

10. The computer processor of claim 9 wherein said second processor architecture utilizes a wider instruction word than said first processor architecture.

11. The method of improving performance in a computer processor comprising the steps of:

transferring object-level instructions having a first format from a memory to an instruction cache in said processor for execution in multiple execution units;

translating said object-level instructions to generate translated instructions having a second format;

replacing said object-level instructions with said translated instructions in accordance with positional information provided by a program counter and said translated instructions having multiple fields with contents that differ from those of said object-level instructions; and providing a first execution unit of the multiple execution units which executes instructions having said first format;

providing a second execution unit of the multiple execution units that executes instructions having both the first format and the second format; and providing a dispatch unit coupled to the instruction cache that receives said object-level instructions having said first format from said bus; and receiving at said dispatch unit said object-level instructions from said instruction cache and dispatches said translated instructions having said second format to said execution unit, wherein said translation step combines functions of two successive object-level instructions having said first format into a single translated instruction having said second format which is executed in the second execution unit and decreases the number of instructions to be executed and increases processing throughput, wherein said translation logic is coupled to said bus and to an instruction cache, and said translation logic receiving said object-level instructions having said first format from said bus and transfers said translated instructions having said second format to said instruction cache.

12. The method of claim 11 wherein said translating step comprises:

providing a translation table comprising conditions to be met by said object-level instructions for replacement by said translated instructions;

detecting successive instructions meeting said conditions;

constructing said translated instructions from instructions detected in said detecting step; and replacing said detected instructions with said translated instructions.

13. The method of claim 12 wherein said detecting step comprises:

comparing said object-level instructions with entries in said translation table; and generating a detection signal to notify control logic of object-level instructions meeting the conditions of said table entries.

14. The method of claim 12 wherein said constructing step comprises constructing said translated instructions in accordance with translation rules specific to said execution unit in response to said detection signal.

15. The method of claims 11 and 12 wherein said first format conforms to a first processor architecture, and said second format conforms to a second processor architecture, and wherein said execution unit executes both of said object-level instructions and said translated instructions.

16. The method of claim 15 wherein said second processor architecture utilizes a wider instruction word than said first processor architecture.

* * * * *